United States Patent [19]

Hilling

[11] 3,956,432

[45] May 11, 1976

[54] AERATION TECHNOLOGY

[75] Inventor: David L. Hilling, Bismarck, N. Dak.

[73] Assignees: Russel E. Logan, Belfield; Terry E. Logan, Medora, both of N. Dak. ; part interest to each

[22] Filed: Oct. 23, 1973

[21] Appl. No.: 408,557

[52] U.S. Cl.............................. 261/30; 261/120; 261/122; 261/123
[51] Int. Cl.² ............................................ B01F 3/04
[58] Field of Search ............. 261/30, 122, 120, 123

[56] References Cited
UNITED STATES PATENTS

| | | | |
|---|---|---|---|
| 302,326 | 7/1884 | d'Heureuse | 261/120 |
| 2,218,635 | 10/1940 | Borge | 261/122 |
| 2,754,264 | 7/1956 | Fischer | 261/123 |
| 2,770,319 | 11/1956 | Hagenbook | 261/124 |
| 2,825,541 | 3/1958 | Moll et al. | 261/124 |
| 3,171,820 | 3/1965 | Volz | 261/94 |
| 3,193,260 | 7/1965 | Lamb | 261/120 |
| 3,235,234 | 2/1966 | Beaudoin | 261/120 |
| 3,365,178 | 1/1968 | Bood | 261/120 |
| 3,416,776 | 12/1968 | Gamer | 261/122 |
| 3,505,213 | 4/1970 | Anthony et al. | 261/124 |
| 3,575,350 | 4/1971 | Willinger | 261/122 |
| 3,644,231 | 2/1972 | Maruya et al. | 261/122 |
| 3,650,405 | 3/1972 | Morrison | 261/122 |
| 3,683,627 | 8/1972 | Girden | 261/123 |
| 3,785,629 | 1/1974 | McKinney | 261/122 |
| 3,799,511 | 3/1974 | Svantesson | 261/124 |
| 3,808,123 | 4/1974 | Neel | 261/124 |

FOREIGN PATENTS OR APPLICATIONS 200,516   4/1958   Austria .............................. 261/122

*Primary Examiner*—Tim R. Miles
*Attorney, Agent, or Firm*—Robert C. Baker

[57] ABSTRACT

The easily serviced aeration apparatus of the invention includes a central base structure comprising a source of air under pressure, a plurality of lateral passages extending radially outward from the source, a diffuser hanger at the outward end of each lateral passage, and a dependant assembly suspended in hanging relationship downwardly from each hanger. Each dependant assembly comprises a downwardly depending flexible air conduit, an aeration diffuser at the lower end of the conduit, and means for maintaining the diffuser at a submerged depth as air is fed thereto. Additionally provided is a porous plastic aeration diffuser.

50 Claims, 10 Drawing Figures

U.S. Patent   May 11, 1976   3,956,432
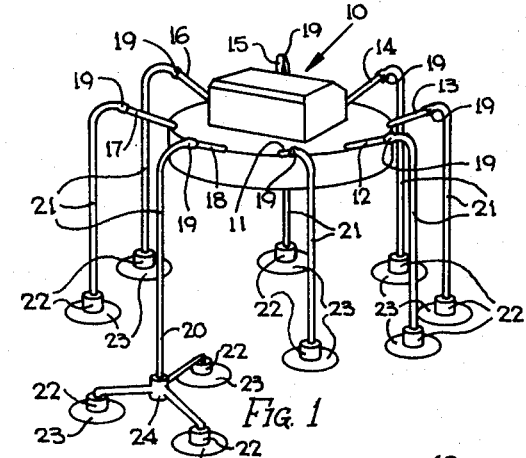
Fig. 1
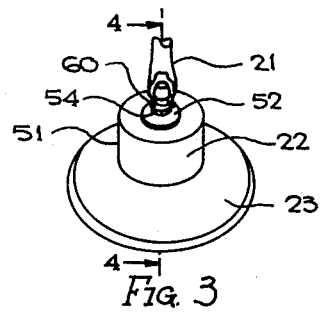
Fig. 3
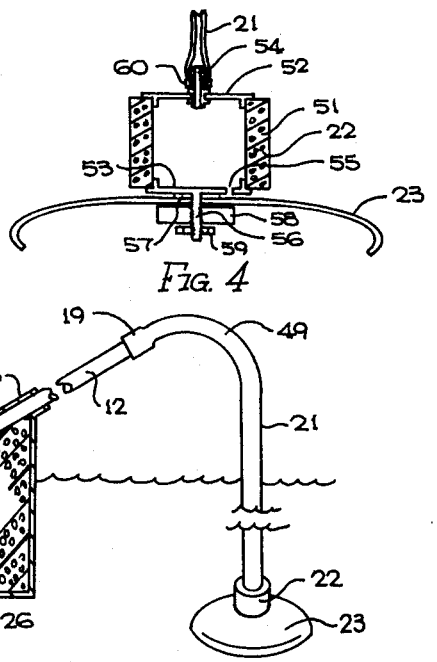
Fig. 4
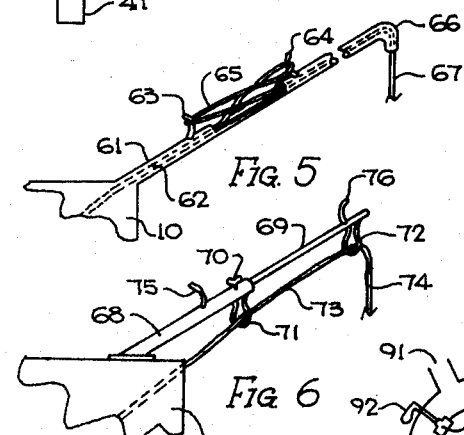
Fig. 2
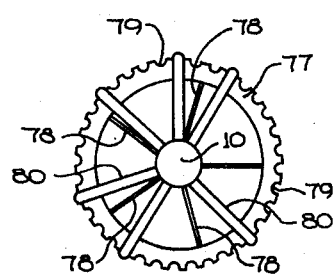
Fig. 5
Fig. 6
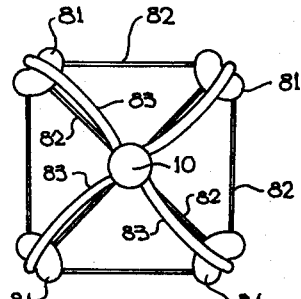
Fig. 7
Fig. 8
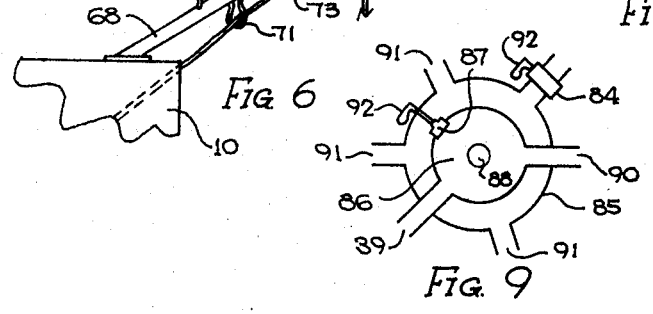
Fig. 9
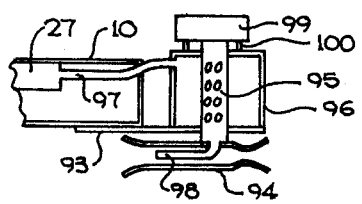
Fig. 10

AERATION TECHNOLOGY

This invention relates to apparatus for aerating liquids. More particularly, the invention is directed to easily serviced aeration apparatus which comprises a central source of air under pressure and a plurality of submerged aeration diffuser means suspended from hanger means located radially outward from the central source. The invention also relates to a new and improved aeration diffuser assembly.

Teachings of the invention are useful in the art of aerating a wide variety of liquids. By far the most important liquids needing man's assistance by way of improved aeration (that is, the dissolution or mixing of oxygen therewith to promote the purification of the same) are those which are watery. Liquid sewage is a prime example. But many natural lakes, streams and rivers are now so polluted as to resemble sewage. The invention is useful in the aeration of bodies of watery liquids whether natural or artificial. It is especially useful in the aeration of sewage lagoons.

While the exact mechanism by which aeration of a watery liquid effects purification of the same may be debatable, it generally is understood that aeration promotes the growth of aerobic bacteria. Such bacteria are present in human waste and in most sewage and other polluted bodies of water. When fed oxygen, they multiply and consume or convert pollutants to innocuous matter. Additionally, aeration may effect some direct oxidation of pollutants. In any event, aeration is widely recognized as a successful way to effect purification of polluted waters; and the aeration exposure of water as effected by nature (e.g. turnover of water by temperature changes, flowing streams, waterfalls, etc.) is widely recognized to cause this effect. But nature needs help to overcome man's rate of pollution.

Known prior art is set forth in the following U.S. Pat. Nos.: Ford 2,294,973; Moll et al 2,825,541; Reilly 3,182,978; Bell 3,189,334; Lamb 3,193,260; Ruston 3,217,886; Brewster 3,309,067; Smith 3,320,928; Wood 3,396,950; Anthony et al 3,505,213; Welles, Jr. 3,521,864; Mendelson 3,540,222; Eron 3,653,641; Nogaj 3,669,422; Bastiaanse 3,677,936; Girden 3,683,627; Arneson 3,684,460; Auler et al 3,709,470; Savage et al 3,722,836.

Those prior art approaches involving a pumping movement of liquids require much expenditure of energy to get relatively brief exposure of a liquid to air. Such approaches are expensive to operate, particularly in terms of the cost per quantum of aeration. Floating pump apparatus (e.g., an annular doughnut float) with a depending central draft tube (to pull up liquid from greater and greater depths) can sometimes create problems in terms of pulling up or disturbing a particulate lining or floor of a sewage lagoon. Still, further, icing during winter months interferes with the successful operation of such mechanisms. But floating pump mechanisms at least possess the merit of being easily moved to treat different areas of a liquid body.

Those prior art approaches involving the use of a submerged diffuser (or bubbler system or the like) have usually been more efficient than the water movers in terms of their quantum of aeration per unit of operation cost; but this becomes true only when the prior art submerged diffuser systems can be maintained in operation without undue down-time for repairs. The very nature of the apparatus and submerged diffuser arrangements heretofore known has not contributed to easy maintenance or servicing of such systems. Frequently, the diffusers heretofore employed have been massive and mounted more or less permanently at the bottom of a lagoon, which requires either lagoon drainage to conduct repairs or requires a workman to be equipped to descend through sewage. When prior art diffusers have not been permanently mounted at the bottom of a lagoon, they have been essentially placed in a position of rest at the bottom, with conduiting networks also lying on or buried at the bottom. Far too frequently, the aeration conducted using such prior art arrangements tends to disturb particulate linings or floors of sewage lagoons.

By adopting teachings of this invention, the advantagees of submerged diffuser efficiency are realized, while at the same time gaining the benefit of surface maintenance or servicing of the system. Preferred practices according to the invention mitigate and usually substantially completely obviate the problem of sucking up or disturbing natural or specially prepared particulate (e.g., bentonite) linings or floors of sewage lagoons. Escaping air from the submerged diffusers of the apparatus hereof causes upward water movement and contributes to ice-free operation; but even some ice formation does not seriously hamper the effectiveness of operation of this new system. Important further benefits available by practicing preferred teachings herein are high efficiency in terms of the quantum of aeration per unit of operating cost, relatively economical installation and operational expense, flexibility of adjustment of the total system, convenient portability or movement for the total system within a lagoon or from one lagoon to another (even possible is controlled floating powered movement of the total system in a pattern to cover different parts of a single body of a water liquid), and still others as will be evident from the detailed teachings herein.

The aeration apparatus of this invention, when placed in operation, is easily serviced from the surface of the liquid. It includes a central base structure comprising a source of air under pressure. The base structure is at a level, in relationship to the surface of the liquid, at least as high as a floating relationship on the surface. A plurality of lateral passage means extend radially outward from the source for conducting air outwardly from the source. A diffuser hanger means is located at substantially the outward end of at least three such passage means. Each hanger means is disposed radially outward from the source in spaced relationship to all other hanger means. A dependant assembly is suspended in hanging relationship downwardly from each of the hanger means. Each dependant assembly comprises (a) a downwardly depending flexible air conduit connected in operable air conducting relationship to the outward end of the lateral passage means at the respective hanger means with which the assembly is associated, (b) an aeration diffuser means fixed substantially in pendant relationship to the lower end of the flexible air conduit in operable connection therewith for receiving air therefrom, the aeration diffuser means being adapted to allow escape of air therefrom for upward aeration movement through the liquid, and (c) means for substantially maintaining the aeration diffuser means at a submerged depth within the liquid in the aforesaid pendant relationship as air is fed thereto from the aforenoted source.

The base structure may additionally include a float means for supporting the base structure in floating relationship on the surface of the liquid. The lateral passage means may comprise flexible conduits or relatively stiff pipe members. The hanger means may comprise the outward end of a stiff pipe member, or may comprise a conduit guide or holder element on an outwardly extending arm, or may comprise a float structure, or may comprise any other suitable means from which the dependent assembly may be hung. Means for adjustment of the outward distance of the lateral passage means as well as the hanger means, plus means for adjusting the depth of an aeration diffuser means, are provided. Also means are provided for adjusting the air flow or pressure of flow for at least one aeration diffuser means to a level different from that for at least one other diffuser means. Further a shielding means is provided for obstructing updraft movement of liquid from the locality below an aeration diffuser means as other liquid (such as the liquid laterally to a diffuser) is drawn upwardly by rising air escaping from the diffuser means.

The preferred aeration diffuser assembly of the invention comprises a walled housing having a cavity therein. An inlet port is provided for feeding air into the cavity. At least more than one-fourth of the total gross area of the walls of the housing consists essentially of a layer of structurally stiff and compression resistant organic plastic having open minute passages extending therethrough from the cavity side thereof to the exterior side thereof. The passages are adapted to allow the passage of air therethrough and the emergence of the air on the exterior side. Further, an evacuation hole is included in a wall of the housing. Preferred diffuser assemblies additionally include a shield member affixed to the diffuser housing on a side of the housing which is lowermost during aeration use of the diffuser assembly. The shield is sufficiently large to extend outwardly as a circumscribing wing structure beyond the housing. The shield is adapted to obstruct aeration draft movement of liquid located on the side of the shield away from the walled housing.

The invention will further be described with the aid of a drawing, made a part hereof.

In FIG. 1 of the drawing, a schematic perspective line sketch of the overall arrangement and array of elements constituting an aeration apparatus of this invention is set forth.

FIG. 2 is a schematic cross-sectional view (taken along a vertical plane) through FIG. 1, particularly showing a base structure according to the invention. Parts are broken away for simplification; and only one radially extending arm and dependant assembly is illustrated.

FIGS. 3 and 4 are devoted to schematic perspective views and cross-sectional views (along line 4—4 of FIG. 3), respectively, of a new aeration diffuser assembly of the invention.

FIGS. 5 and 6 each illustrate a different alternate embodiment for diffuser hanger means and other structures extending radially outward from a base structure of the invention, with parts broken away.

FIGS. 7 and 8 are devoted to schematic top plan views (looking straight downwardly), in line sketch form, illustrating alternative embodiments for the overall arrangement of elements forming lateral passage means and diffuser hanger means of the invention. The dependant assembly is omitted from these views.

FIG. 9 is a schematic cross-sectional view, in line sketch form, along a horizontal plane through an alternate manifold structure for the air at the central base structure of the apparatus. Apart from the manifold itself, all other parts of the base structure are broken away and omitted from this view.

FIG. 10 is a vertical schematic cross-sectional view, in line sketch form, of a venturi apparatus fixed to a base structure, with parts broken away.

Referring to FIG. 1, basic relationships and elements of the invention will first be discussed.

A central base structure 10 is suitably looked upon as a foundation or reference point for explaining most of the relationships between elements. The base structure 10 includes a source of air under pressure (not shown in FIG. 1). Extending radially outward from the source of air at the base structure 10 are a plurality (at least three) of lateral passage means 11 through 18, inclusive. These passage means are for conducting air laterally outward from the source at the base 10.

At the outward end of each (at least three) lateral passage means is a diffuser hanger means 19. Each hanger is identified by the numeral 19. Thus, each diffuser hanger means is disposed radially outward from the source of air. Further, each hanger means 19 is in spaced relationship to all other hanger means.

A dependant assembly is suspended as a hanging structure depending downwardly from each hanger means. All dependant assemblies are suitably identical. They, however, may vary, if desired, in various special details of structure and function; and the dependant assembly identified by numeral 20 in FIG. 1 illustrates a modified form for the diffuser arrangement at its lower end.

The essential features for each such dependant assembly will be explained at this point (and the numbering employed in FIG. 1 will be identical for all common elements except where necessary for clarifying the dependant assembly identified by numeral 20 in FIG. 1). First, each dependant assembly includes a downwardly depending flexible air conduit 21 which is connected in operable air conducting relationship to the outward end 19 of a lateral passage means 11–18, inclusive. The connection between the portion of the overall conduiting characterized as "lateral passage means" (11 through 18, inclusive) and the downward portion characterized as "flexible air conduit" 21 is at the respective hanger means 19 for the two portions. Thus, the connection of a dependant assembly is always at the respective hanger means 19 with which the dependant assembly is associated. Secondly, each dependant assembly includes an aeration diffuser means 22 fixed substantially in pendant relationship to the lower end of its flexible air conduit 21. The diffuser means is in operable connection with the flexible air conduit 21 to receive air from the flexible air conduit 21. Further, the diffuser means 22 is adapted to allow the escape of air from it for upward aeration movement through a liquid being aerated. Thirdly, the dependant assembly includes means 23 for substantially maintaining the aeration diffuser means at a submerged depth, in the aforenoted pendant or hanging relationship, as air is fed to the diffuser means from the source of air at the base structure.

In the case of the dependant assembly identified by numeral 20 in FIG. 1, the same critical elements and relationships are present. However, the structural complex at the lower end of the flexible conduit 21 is different. The flexible air conduit 21 feeds into a relatively stiff triangular plenum 24 having three air distribution conduits or arms. To each of the three arms is affixed a diffuser 22 and a means 23 for maintaining the same submerged, as aforenoted. Thus, plural elements may be employed at any part of the dependant assembly, if desired.

The means for maintaining any diffuser means at a submerged depth can vary greatly. Generally, it will be some sort of weight (e.g., cast iron covered with a glaze to give it corrosion resistance, or a block of cement, or a mass of lead, or even pellets of lead in a container). The shape of the weight may or may not be such as to perform some other function than that solely of maintaining diffusers submerged in pedant relationship as air is fed thereto. For purposes of illustration, the weight in FIG. 1 is shaped as a shield 23, that is, a circumscribing radially outward wing. Shields 23 are fixed at the lower part of the housings of the diffuser means 22. A weight means, however, may be fixed above the diffuser. For example, a doughnut weight, or series of the same, might be nested above a diffuser 22 with an air conduit 21 extending through the doughnut center.

Several details for central base structures 10 of the invention will be explained with particular reference to FIGS. 1 and 2. To be first emphasized is that a base structure 10, such as for example shown in FIG. 1, may not incorporate any means at all for supporting it in a floating relationship on the surface of a liquid. It may be substantially free of any such means. But it may nevertheless be adapted for mounting upon or resting upon a solid ground-supported surface, such as an upstanding pier in a sewage lagoon, or on a dock extending into a lagoon, or even possibly at a shore structure. (If a shore structure is employed as the base for mounting a bas structure, it will be evident that the lateral passage means 11-18 will be concentrated in an array extending outwardly, possibly to various distances, at the lagoon side of the base structure.)

Preferably, however, the base structure 10 (see FIG. 2) will be designed to incorporate some sort of means to give it floating capability (such as by the use of low density materials, or by use of a chamber or cavity for vacuum or for low density gaseous fluids such as air, or by the use of some special shape or structural feature to effect floating capability). As shown in FIG. 2, floating capability may be effected by the use of a low density float member 25 suitably formed out of expanded or foamed polyurethane, polystyrene, or any of a variety of organic plastics. The expanded plastic suitably contains minute pockets or cavities or voids of closed cell character randomly distributed through it. Alternatively, expanded open cell plastics covered with an appropriate sealing skin may be used. Fiberglass reinforced resinous coatings are useful. Likewise metal housings 26 or containers may be used as a covering or the like for a low density plastic float. Preferred metals to employ for float housings are either corrosion resistant (such as stainless steel or aluminum) or are covered with a corrosion resistant coating (such as a chromium clad or a plastic clad iron or steel housing).

Practical considerations dictate that the size of a floating base structure 10, including the means 25 for providing floating capability for it, should be no larger than necessary to maintain it in relatively stable non-tipping relationship on the surface of a watery liquid. Thus, base structures having float means 25 of about 2 or 3 feet in diameter, or even somewhat smaller, can be useful. But floating base structures of large size, even as great as 5 or 10 or more feet in one or more horizontal dimension, with or without float arms extending therefrom, and with or without large openings vertically therethrough, are also useful and contribute to a non-tipping and even relatively non-tilting floating relationship on a sewage lagoon. Further, the overall configuration of the base structure need not necessarily be relatively round, as is illustrated and preferred, but may be rectangular or of some other shape.

Critically incorporated in the base structure is a source of air under pressure. This source may take the form of a manifold 27 (see FIG. 2) having an inlet port 28 for receiving air and a plurality of outlet ports 29 (normally a separate outlet port for each lateral passage means). The manifold 27 is capable of distributing air into the lateral passage means. Two such lateral passages or conduits 12 and 16 are shown in FIG. 2, but only one 12 is shown with any significant detail.

Pumping means 30, preferably of the positive displacement type, is suitably employed to fed or move air into the manifold that is, the source of air under pressure at the base structure). The type of pump (that is, air mover) and the means for powering it can vary. The pump may be one wherein a piston positively moves the air. As illustrated in FIG. 2, a positive displacement pump may have two figure eight impellers 31 and 32 which rotate in opposite directions. Each impeller has two lobes, which move cooperatively with one another. The gearing to effect impeller movement in the direction of the arrows on the lobes is not shown in the drawing, as it is well understood. (Indeed the pump itself is well known and sometimes called a "roots" type pump). As each lobe of an impeller 31 and 32 rotates past the air inlet 33 of the pump, the lobe traps a quantity of air between it and a wall of the housing 34 for the impellers. The air is moved to the pump outlet 35 under the positive force of the impellers 31 and 32. To be recognized is that any suitable pump means as selected should have the capability of feeding air into the source or mainfold 27 at a sufficient rate and under sufficient pressure to cause air to pass through the conduiting (such as lateral passage 12) and out a submerged diffuser means 22. For a quick approximation or general estimate of the air pressure needed, one may think in terms of establishing a manifold or source pressure of about ½ pound per square inch per foot of depth of the lowest submerged diffuser 22. Thus, a submerged diffuser at about 10 feet in depth will generally effectively serve the function of air escape and aeration of a liquid when the manifold or source is maintained at around 5 psi.

Motive power for operating the pump is suitably provided by an electric motor 36 mounted on the base structure 10. The belt 37 from the motor pulley 38 is broken away in FIG. 3 in order to permit greater visual clarity for the showing; but the belt 37 suitably extends to a pulley (not shown) on the shaft of one of the impellers 31 and 32; and the gearing (not shown) for operating the other impeller is driven from the shaft turned by the belt 37.

Where an electric motor is employed as the motive power means, the line or cord for electricity (not shown) suitably extends from the floating base structure 10 (either as a floating line or a submerged line, as desired) to any suitable electrical source on shore or on a buoy. Also useful as a motive power means, however, is an internal combustion engine mounted on and carried by the composite base structure 10 itself, with fuel for the same in a tank on the base structure or supplied by a hose to it. Even a windmill might be used, particularly in conjunction with other power means.

Since the preferred diffuser means of the invention has minute passages for the escape of air from it, and because clogging of those passages is undesired, the preferable practice is to filter air taken in at the suction or intake side 33 of the pump. Conventional automobile air filtering mechanisms are suitable, as also are porous foamed plastics and the like. An air filter is graphically identified at numeral 39 in FIG. 2.

A removable cover 40 is desirably placed over the pump and motor for it to protect them from weather elements as well as from undue contamination by the liquid such as sewage undergoing treatment.

where a floating base member 10 is to be maintained relatively stabilized against floating or drift movements to different locations on a lagoon, it may be anchored by the use of guy lines or wires extending between it and points along the edge of the lagoon. Alternatively, anchoring of it may be accomplished by using submerged weight anchors. A weight anchor 41 might be fixed to an anchor line or chain 42 (see FIG. 2) extending in a special vertical passage 43 through the float member 27 and fastened at its upper end at any suitable element 44 on the base structure. Any suitable means or hooks 45 may be employed for taking up varying amounts of slack in the anchor line 42.

Illustrated in FIGS. 1 and 2 are lateral passage means formed out of relatively stiff pipe members 11–18, inclusive. They may be formed of plastic, or metal, or any other suitable material. They are relatively stiff, but need not be absolutely rigid (although they suitably may be rigid). Their stiffness is such that they remain in their relative radial orientation once they are placed in position. But they may curve downwardly from their own weight, in much the same manner as a fish pole. Even so, they are sufficiently stiff to project outwardly from the base structure, as required. These pipe members 11–18 are held at their radially inward end at a substantially fixed mounting on the base structure (whether that mounting is on the float or some other part of the central base structure). Illustratively, the mounting (see FIG. 2) may be a sealed connection 46 at the skin or metal housing 26 for the float 25 as well as a rigid connection 47 through a rigid conduit section 48 fixed rigidly to a rigid manifold port 29. Further, the conduit connections with the flat housing 26 may be embedded in the foamed plastic 25. However, for embodiments of the invention employing substantially stiff pipe members as lateral passage means, it is only necessary that some sort of means be employed for holding the radially inward end in a relatively fixed position at the base structure 10, even though the fixed position may be adjustable. If desired, portions of the conduiting between the manifold and the mounted inward end of a stiff pipe may be flexible (i.e., the conduit line 48 in FIG. 2 could be very flexible).

It is not critical that the lateral passage means 11–18, that is the stiff pipes, be in a single horizontal plane as they extend radially outward in a fan or octupus array circumscribing a base structure 10. They may extend in a slope (generally no more than about 30° from the horizontal) either upwardly or downwardly from their mounting at the base structure 10. Also, they need not necessarily be straight in their radial extension or projection from the base structure. They might be curved. But they at least extend outwardly; and the outward direction is at least generally radially outward, whether or not it is accomplished with some vertical or horizontal curvature.

In the embodiments of FIGS. 1 and 2, the diffuser hanger means 19 consists essentially of the outward end of the stiff pipe members 11–18, inclusive. It is from the outward end 19 that the dependant assembly (which carries the diffuser means) is hung. Observe that the flexible air conduit 21 of the dependant assembly may be attached to the outward end 19 of the stiff pipes in a manner requiring the flexible air conduit to curve in a drooping manner (see 49 in FIG. 2) before it depends in truly vertical hanging relationship. In essence, the flexible air conduit 21, at the location of the droop curvature 49, can either be looked upon as a part of a total "hanger" structure at the end 19 of the stiff pipe, or as part of the essentially downwardly depending flexible air conduit, or as a "connector" element or link therebetween. The essential feature is that the dependant assembly "hangs" through flexible conduit 21 in suspended fashion downwardly from the hanger means.

Preferably, in all embodiments of the invention, the diffuser hanger means (however it may be formed or whatever it may consist of) is located at a level, in relationship to the surface of the liquid undergoing aeration, at least as high as a floating relationship on that surface. In cases where the outward end 19 of stiff pipe members (or of other lateral passage means) serves per se as the hanger means, that outward end is preferably at least as high as the aforenoted floating relationship (at least during times when the base structure is stabilized against tilting movements).

When hanger means of the invention are submerged, as they may be in less desirable practice of the invention, the maintenance and repair or servicing of them (should they become fouled or otherwise fail to perform their function properly) presents one with the problem of surface dismantling of pertinent parts of the apparatus to elevate the malfunctioning hanger means for surface repairs, or the problem of possibly tilting the entire apparatus to surface the errant hanger, or the problem of using some other expedient to surface the errant hanger so that surface repairs may be conducted. The alternative of a workman submerging himself to conduct such repairs is not necessary nor desirable. (Submerged hangers present little or no problem in terms of surface servicing of submerged aeration diffusers. The submerged diffusers may be temporarily elevated to the surface easily from a boat by hooking the downwardly depending flexible air conduit 21 at a location beneath the hanger means 19, and then lifting the conduit and diffuser means 22 and any associated elements into the boat.)

For embodiments employing stiff pipes as lateral passage means, as illustrated in FIGS. 1 and 2, a preferred practice is to slope the pipe angularly upwardly as well as outwardly. Such an arrangement easily permits the outer end 19 or hanger end of the pipe to be well above the surface of surrounding sewage or other liquid. Thus, it is easily accessible for inspection and repair. A further benefit for such an arrangement is that visual inspection from a distance permits one to observe the approximate horizontal pattern of location and spacing relationships between hanger means 19 and therefore between the hanging submerged diffuser assemblies. The rolling of liquid at the surface, as caused by rising bubbles of air from the diffusers, also permits one to gain an idea of such submerged spacing relationships. The pattern of such spacing is preferably such that substantially the entire body of liquid where the aeration apparatus is operating is circulated (as a result of air rising from the diffusers) sufficiently to be subjected to aeration. And the scope or breadth of the area of such aeration (and also the volume of the liquid subjected to such aeration), when accomplished using apparatus of this invention, can be surprisingly massive as well as thorough.

Details of a new preferred type of aeration diffuser assembly and elements associated with it will now be discussed with reference to FIGS. 1 and 2 and particular reference to FIGS. 3 and 4.

The diffuser 22 comprises a walled housing having a cavity 50 therein. The walls of the housing surround the cavity. Suitably, a cylindrical wall 51 or sleeve-like wall may be employed with plates or caps 52 and 53 serving at each end of the cylinder as end walls; but square housings as well as other shapes may also be used. The cylindrical approach advantageously makes for greater simplicity and provides highly effective results in terms of aeration performance.

The end plates or walls at the top 52 and bottom 53 of the cylindrical portion 51 are suitably formed of plastic or metal (preferably corrosion resistant such as stainless steel), and are held in place either by using a friction fitting flange extending inwardly into the cylinder from the plate or by adhesives (e.g., epoxy adhesive) or both.

A conduit fitting 54 suitably extends through a central hole in the top plate 52 and is fastened to it by any suitable means. The depending flexible air conduit 21 of the depending assembly is fastened to the fitting 54 so as to permit feeding of air from the flexible conduit into the cavity 50. A clamp 60 may be used to fixedly secure plastic flexible hose 21 to fitting 54.

A hole 55 of relatively large size, suitably at least a millimeter in diameter up to possibly a half centimeter in diameter, or even twice that size, is preferably located in the bottom plate 53 of the lowermost wall of the diffuser as it depends from a hanging means. (The function of this hole 55 is mainly that of permitting rapid purging or evacuation of water from the cavity 50 of a diffuser which has been kept submerged during a period when no air has been pumped to it. A submerged diffuser not receiving air under pressure will gradually allow water to seep through its walls and enter the cavity. It is a slow process to use pressurized air to force the water back through the minute passages of the diffuser walls; but air under pressure quickly causes water to evacuate the cavity through a small hole at the bottom of the diffuser.)

At least more than one-fourth of the total gross interior surface area and at least more than one-fourth of the total gross exterior surface area of the walls of the housing of the diffuser should consist essentially of opposing surfaces of a layer of structurally stiff and compression resistant organic plastic having open tortuous minute passages extending therethrough from the cavity side to the exterior side of the layer forming the wall. This criteria of at least one-fourth is necessary to gain desired high aeration performance per unit or measure of size for the diffuser. A sleeve 51 about 3 or 4 inches internal diameter and with walls about a half centimeter or ¼ inch thick is useful. Even greater wall area may and desirably is formed of porous organic plastic. A cylindrical wall 51 of porous organic plastic conveniently permits well over 50 or 60% of the gross wall area of the diffuser to exhibit such porosity. Open passaged foamed polyurethane plastic cylinders 51 are exceedingly useful. The tortuous passages through the cylinder wall 51 of such organic plastic may even be totally unnoticeable to the naked eye. They may be exceedingly tiny. But they effectively must and do allow air to pass therethrough and escape on the exterior side, with the result that a multiplicity of very minute and even microscopic bubbles rise upwardly from the diffuser. Bubbles of about 60 microns size are excellent. While polyurethane layers with exceedingly thin or minute tortuous passages are preferred, a wide variety of plastics and variety of sizes for tortuous (or even straight or molded) passages can give useful results consistent with the preferred approach of this invention. Because exact size measurements are both difficult to make and subject to considerable interpretation, the basic criteria for the size of the passages through the layer of plastic is best stated as follows: They are at least large enough (although preferably very tiny) to allow the passage of air therethrough from the internal air pressure side or cavity side of the layer of plastic when air is fed to the cavity 50 to create a cavity air pressure condition of one pound per square inch above the water pressure condition external to the cavity. Generally this is achieved when cavity air pressure is on the order of a half pound per square inch per foot of depth of the diffuser. And no matter how large the passages are, they are at least small or minute enough to restrict the escape of air so rapidly therethrough that substantial amounts of water enter the cavity (and block air escape from those passages obstructed or clogged by water) even when the pressure of the air as fed to the cavity through unobstructed main conduits 21 from the air source (i.e., not the cavity pressure per se) is at a level at the manifold 27 equal to the aforenoted 1 pound per square inch above the water pressure condition external to the diffuser. Thus the term "minute" is deemed as definitive as reasonably possible for including both passages of the preferred very tiny size (i.e., at least so small as to not be readily noticeable by a casual naked eye glance) as well as those passages which are larger and noticeable as open pores or passages by the casual naked eye glance (but nevertheless still minute enough to effect the preferred small bubble aeration performance under pressure conditions aforenoted). To be recognized is that the pressure of water or other liquid at the depth of diffuser location contributes to air escape from the diffuser through the minute wall passages in preferance to escape through the evacuation hole 55 at the bottom wall of the diffuser. Of course, the preference is limited; and any build up of pressure within the cavity 50 beyond that about equal to the pressure of water or liquid at the level of the bottom evacuation hole 55 per se in the diffuser will result in air escape through the evacuation hole 55. Such air escape is not objectionable, and contributes, as do the tiny bubbles of air, to both updraft rolling movement of the liquid as well as aeration of the liquid. But greater aeration comes from use of tiny bubbles.

While the new diffusers of this invention are preferably selected for use as diffuser means in the composite aeration apparatus hereof, it also is contemplated that diffusers as heretofore known may alternatively be substituted and employed in the composite apparatus. There are many such earlier known diffusers; one is taught in U.S. Pat. No. 3,396,950.

Whatever diffuser is employed, it must have means for substantially maintaining itself at a submerged depth within the liquid undergoing aeration, in a pendant or hanging relationship from a hanger means (19 in FIGS. 1 and 2), as aeration air is fed to it from the air source or manifold 27. This criteria can be satisfied by making the diffuser out of materials which are dense and heavy enough to keep it submerged in required pendant relationship. It also can be satisfied by using weights. Excess weight over that needed to maintain the hanging relationship is generally not objectionable; but insufficient weight to maintain the hanging relationship during aeration can create shifting motions (both lateral and rising movements) for the diffuser assembly. Shifting movements not only preclude a reliable distribution of air in the aeration pattern needed for relatively thorough aeration of a liquid, but also can cause entanglement of flexible conduits. But the exact weight critically needed to maintain the hanging relationship during operation will vary greatly, and is dependant both on the depth selected for a particular diffuser assembly as well as the weight or density of materials used in fabricating the diffuser structure. Nevertheless, the weight needed is easily and quickly determined in practice; and the better practice is to always employ a modest excess of weight, beyond that needed to achieve hanging pendancy. If desired, the weight may be gained by using a shield 23 having the proper density or lack of bouyancy and necessary weight. Generally, however, added dense weighty structures are in some way fixed to the diffuser, as aforenoted.

In FIG. 4, the lower cap of plate 53 of the diffuser walls is equipped with a fastener or holding element in the nature of a bolt 56 extending downwardly from it. A shield 23 having a hole for the bolt 56 is fitted on the bolt with a spacer washer 57 between the shield 23 and the lower cap or plate 53 of the diffuser. The washer 57 spaces the shield 23 from the lower cap 53 sufficiently to allow a relatively unobstructed exit path from the interior 50 of the housing through the evacuation hole 55 to the exterior of the total diffuser assembly. A further doughnut weight 58 is fitted on the bolt 56 (suitably of cement or cast iron at about 2 pounds, with more such weights added where needed to overcome bouyancy during aeration). A nut 59 is used to secure the dependant parts (shield and weight) to the diffuser.

A shield is an especially desirable structural feature of preferred composite diffuser assemblies of the invention, whether it is formed out of low density or high density weighty materials. It should be fixed to the lower part of the diffuser as the diffuser hangs in pendant relationship during aeration. Generally, therefore, the shield will be on the side of the diffuser housing substantially opposite the side carrying the fitting 54 for the inlet port to the cavity 50 of the housing. The shield 23 is sufficiently large to extend outwardly from the diffuser aeration walls to form a circumscribing or annular wing structure. The circumscribing wing may extend only 5 or 10 centimeters or so outwardly from the diffuser housing aeration walls 51; or it may extend as much as a meter (or three feet) or more outwardly. It preferably extends at least about ten centimeters or at least 4 inches outwardly from the diffuser body. Further, it preferably extends radially outwardly as a relatively annular circumscribing wing structure in more or less a horizontal plane, possibly with a slope or curvature in the radially outward direction. The outward slope or curvature may place the peripheral edge of the shield upwardly or downwardly from a horizontal plane through the central portion of the shield as the assembly hangs in pendant relationship. The deviation of the outer peripheral edge (upwardly or downwardly) from horizontal may be so great as to place it at an angle (taken at the central part of the shield) approaching 40° or even 50°. Both its size and any angular relationship are such that it performs the function of at least obstructing aeration draft movement of liquid located on the underneath side of the shield (that is, from the vicinity below the diffuser). The lower or underneath side of the shield is always looked upon as being below the diffuser away from the aeration walls 51 of the diffuser. Thus, the shield 23 performs the function of interfering with upward draft movement of the liquid underneath the diffuser assembly; and this feature in turn substantially protects particulate linings or floors of a sewage lagoon or the like from being torn up or pulled up as a result of the strong upward draft movement of liquid effected by the rising air from the diffuser. The shield, however, need not and preferably does not completely obstruct modest or slow movement of liquid from the vicinity beneath it. Such liquid also is desirably moved and subjected to aeration. But strong draft movement of that liquid, as would otherwise be effected but for the presence of a shield, is generally undesirable where particulate linings or floors (natural or man made) are employed. Suitable shields may be formed out of plastics (including rubbery plastics, or out of metals or other inorganic materials. A useful shield for diffuser cylinders of about 4 inches external diameter has been formed out of plastic of about one foot in diameter in the shape of a "Frisbie". A "Frisbie" is a platter-type article with downwardly and inwardly curved peripheral portions. A slight downward, and even a peripherally inward, curvature for the annular circumscribing wing of the shield desirably enhances its function in obstructing strong updraft movement for liquid in the vicinity beneath the diffuser.

Since the weight, and even the overall mass or size of a complete pendant diffuser assembly or means can vary and put a fair amount of downward strain on a flexible air conduit 21 (especially when considerable excess weight is added to maintain pendant relationships), it is desirable to employ connector fittings and connections which are highly resistant to rupture or separation during operation. Nevertheless, plastic hoses of about ½ inch internal diameter and 1/16 inch wall thickness have proved useful; and where the amount of weight at the diffuser has been kept to a near minimum to maintain the pendant relationship during aeration, friction connection of the hose to a diffuser fitting (e.g., hose 21 to fitting 54) has proved adequate. Preferably, however, strong and secure connections are employed, and may be reinforced by any suitable means or structural elements.

A variety of hanger means and radially extending elements can be used in practicing the invention. FIG. 5 illustrates a radially extending arc substantially in the form of a relatively stiff (or even a rigid) pipe member 61 extending outwardly from a central base stuucture 10. The pipe member 61 of FIG. 5 is a holding means or guide means for an internal flexible lateral passage means 62. A longitudinal section is removed from the pipe member 61 at a portion intermediate its ends so as to give access to the internal flexible lateral passage means or flexible conduit 62. On the pipe member 61 are hooks 63 and 64 which function as holder elements for wrapping selected portions 65 of flexible conduit 62 thereabout. The outward end 66 of the pipe member serves as diffuser hanger means; and the outward end is suitably curved downwardly as illustrated. Depending flexible air conduit 67 extends downwardly from hanger 66 and carries a diffuser assembly at its end (not shown in FIG. 5). Thus, in FIG. 5, the pipe member 61 not only serves as a guide or holder for flexible lateral air passage means 62, but also as a means for maintaining the hanger 66 radially outward from the base structure 10 and, in particular, radially outward from the source of air at the base structure. Further, the pipe member 61 is basically an arm. It extends radially outward from the base structure 10 and supports the hanger 66 in a radially outward position from the source of air at base 10. A plurality of such arm members may be used to provide a circumscribing array of hanger means of the invention about a base structure. The arms are held at their radially inward end at substantially fixed mounting locations on the base structure 10.

The relatively stiff arm concept for holding hanger means outwardly in an array from the base structure is also illustrated in FIG. 6. But in FIG. 6, the arm comprises a pole-like element (analogous to a fish pole0 having two parts 68 and 69 fitted in telescoping relationhip to each other. The outer length 69 of the pole is telescopingly fitted into the base length 68 of the pole. The parrt 68 is firmly fixed to the base structure 10 (although the manner in which the part 68 is fixed to base 10 may provide for adjustment of its location on the base 10). If desired, an arm extending from the base may include more than two telescoping parts. The basic principle is that the arm is adjustable in length. (In this connection, adjustability of the length of the arm 61 in FIG. 5 as well as, for example, the arm conduits 11–18, inclusive, of FIG. 1 may also be accomplished by using a telescoping principle.) Means such as a set screw may be employed to fix a selected telescoping of arm parts 68 and 69 against shifting.

Guide means such as loops 71 and 72 (see FIG. 6) are spaced along the length of arm elements 68 and 69 for holding or guiding a flexible lateral passage means 73 as it projects or extends pole) outwardly along the arm elements to a hanger means. relationship the showing of FIG. 6, the hanger means consists essentially of the outermost guide loop 72. Downwardly from it extends the depending part air conduit 74.

Hooks 75 and 76 in FIG. 6 function as holder means for wrapping selected lengths of the lateral flexible conduit 73 thereabout (in the manner illustrated for lateral conduit 62 about hooks 63 and 64 in FIG. 5).

The lateral flexible conduits 62 and 73 in FIGS. 5 and 6 respectively are substantially a continuation of the depending flexible air conduits 67 and 74, respectively, shown in those Figures. Thus, as selected lengths of the complete flexible conduit are wrapped about and held by the holder means (63 and 64 in FIG. 5; 75 and 76 in FIG. 6), the length of the depending flexible air conduits (67 and 74 in FIGS. 5 and 6, respectively) is adjusted or shortened proportionately. Further, and most important, the submerged depth of the aeration diffuser means in pendant relationship on the dppending flexible air conduits is adjusted proportionately.

The just noted flexibility for the composite apparatus permits convenient and fast correction of submerged diffuser depths to the depth most ideal under any particular set of conditions. For example, rare is the lagoon with a uniformly deep floor. Frequently, different diffusers of the assembly will be submerged to varying depths, which will change as the apparatus is moved to different locations. Also, where there is a lowering of the level of the liquid undergoing treatment by floating apparatus of the invention, quick surface adjustment of diffuser depths is desirably accomplished to avoid having the submerged diffuser assemblies rest on the bottom of the lagoon. However, particularly where large shields 23 are employed, little damage results if lowering of the level of a lagoon causes them to meet and even rest somewhat on the bottom as aeration continues. Far preferable, however, is the approach of adjusting submerged depths to maintain the hanging diffuser relationship, without rest on the lagoon bottom, as aforediscussed.

Instead of employing hook holders or the like for taking up or shortening flexible conduit (as illustrated in FIGS. 5 and 6), other means may be employed for that purpose. For example, a friction washer about flexible conduit may be shifted in position on it and abutted against an element (such as the hanger loop 72 in FIG. 6) to shorten the dependant flexible air conduit line. Further, the shortening or taking-up means may be centrally located on a base structure 10, if desired. Preferably, however, the means for adjusting the length of depending flexible air conduits is located at or above the surface of liquid undergoing treatment. But even a line (such as a cable) fixed to part of the dependant assembly and extending to a point accessible or above the surface of liquid undergoing treatment can be useful for this purpose, provided critical hanging relationships are maintained (even though the adjustment may cause a shift for the location of the hanger means for the depending assembly). Even when hanger means according to the invention may be located under the surface of a liquid undergoing treatment (which is not preferred), the means for adjusting the depth of diffusers (i.e., elevating and lowering them in their pendant relationship) should be accessible above the surface of the liquid; and the preferred approach is illustrated in FIGS. 5 and 6.

In FIG. 7, thin doughnut float 77 of relatively large external diameter (at least about 1 and ½ meters or 5 feet, but preferably at least 3 meters or 10 feet, in external diameter) extends annularly about and outwardly from a base float structure 10. The doughnut float is suitably held in the noted orientation by guy lines or rods 78 between base 10 and float 77. The outer peripheral portion of the doughnut 77 may carry a plurality of concave grooves 79 in it. Grooves 79 serve as rest holders for a radially outward extending plurality of lateral passage means 80. The lateral passage means suitably are flexible conduits; and they may be shifted to any desired groove 79 to adjust the angular spacing between them. In the structure of FIG. 7, the grooves 79 in the doughnut 77 serve as the hanger means according to the invention. Downwardly from the end of each conduit 80 in a groove 79 extends the depending assembly (not shown in FIG. 7) of the invention.

Another optional arrangement is illustrated in FIG. 8, where discrete float members 81, suitably grooved at their radially outward portion from the base 10, serve the function of hanger means. The pattern of the radially outward array of floats 81 may be adjusted by changing the length of guy lines 82. Lateral passage means in the form of flexible conduits 83 extend from base 10 to the floating hanger means 81.

It sometimes may be desirable to feed some submerged diffuser assemblies with air under a greater or lesser pressure than others. While separate means may be employed for this purpose, the requirements for different air pressure feds to different diffusers is conveniently accomplished by interposing a pressure regulator or regulators somewhere in the air lines to different diffusers. As illustrated in FIG. 9, a pressure regulator 84 may be interposed in the air line off the central air source 85 (comparable to the manifold 27 of FIG. 2). In fact, each air line off manifold 85 may have a pressure regulator interposed in it. Further, however, the air source or manifold 85 may comprise the outer chamber of a dual manifold having an inner chamber 86, with a pressure regulator 87 interposed in the wall between the inner 86 and outer 85 manifolds. Air fed into the inner manifold 86 through inlet 88 may be maintained at a level (for example, at about 10 psi.) to feed diffuser assemblies (not shown) at a relatively great depth (such as about 20 feet) through air lines connected to outlets 89 and 90. But the air pressure in the outer manifold 85 may be controlled by adjusting the pressure regulator 87 between it and the inner manifold 86 to cause all other outlets 91 (apart from any specifically controlled by a pressure regulator as at 84) to receive a reduced air pressure (for example, about 5 to 7 psi.). Thus, diffuser assemblies (not shown in FIG. 9) fed by outlets 89 and 90 are adapted to function for aeration at greater depths than other diffuser assemblies connected to outlets 91. Any suitable pressure regulators may be employed for this purpose. A variety are available commercially. Their specific nature forms no part of this invention.

Useful pressure regulators may be manually adjustable (as at numeral 92 in FIG. 9) or may be incorporated in the apparatus with automatic adjustment features responsive to the water pressure at the depth of a diffuser being fed through an air line controlled by the regulator. By regulating the pressure of air fed to a diffuser, it becomes possible to maximize the most effective rate of air escape from diffusers, despite varying depths, to a rate which is relatively uniform for each diffuser in an array of the same. Also, the control of pressure enhances the ability to gain air escape in the form of fine or tiny bubbles (through the minute passages of the diffuser walls) as distinguished from the escape of larger bubbles (through an evacuation or purging port in the diffuser), despite the varying submerged depth of an array of diffusers.

Apparatus of the invention designed for floating on the surface of a liquid may also be equipped with means for moving it as a composite apparatus to different locations on the surface of the liquid of a lagoon as aeration continues without interruption. An illustrative arrangement for accomplishing this is illustrated in FIG. 10. A plate 93 is rigidly fixed to the central base structure 10 and serves as a mounting support for a tubular water entraining element suitably in the form of a venturi 94. Venturi tube 94 is fixed to air sleeve 95 having a plurality of ports or openings extending through the sleeve wall in that portion of the sleeve wall located within the chamber of an air housing 96. Air is fed from central manifold 27 through conduit 97 to housing 96 (i.e., one of the diffuser assemblies of FIG. 1 may be omitted and the passage from the central air source then used in the manner of passage 97 to feed housing 96). From housing 96 the air passes into the center of sleeve 95 where it is conducted downwardly and exists through conduit 98 in the downdraft direction within venturi 94. The exit of air draws liquid through the venturi; and the result is that the entire floating apparatus is moved during continuous aeration of the liquid. Suitable seals between housing 96 and sleeve 95 substantially prevent air escape between those elements; but sleeve 95 is rotatably mounted so that, as sleeve 95 is turned rotatably, venturi 94 is commensurately turned. Controls for turning the sleeve 95 are contained in a control box 99 supported on rigid legs extending between it and housing 96. The controlled steering movement of sleeve 95 may be programed as needed for a particular path of movement on a lagoon. Further, the path of movement might additionally be guided by a track or line of the predetermined path suspended in the air above the surface of the lagoon. The suspended track or line might constitute a power line for supplying power to floating apparatus. Time relays and other feed-back apparatus might be incorporated to modify steering movement for the venturi as needed to substantially maintain the predetermined path desired for the movement of the apparatus. Where means such as illustrated in FIG. 10 is employed for moving the composite apparatus, caution should be exercised to adjust the diffuser depths to whatever can safely be employed without dragging diffusers on the bottom of the lagoon.

Illustratively, apparatus of the invention is capable of moving huge quantities of liquid as aeration is accomplished. Escaping air from the submerged diffusers drifts as bubbles move upwardly, and tends to pull watery liquid upwardly as the bubbles move upwardly. It is estimated from tests that the amount of watery liquid so moved by using a small prototype of apparatus according to the invention exceeded 3,000 gallons per minute. As diffusers of the invention are suspended at greater and greater depths, but in spaced relationship from the bottom of a lagoon, the effective area which is subjected to aeration at the surface increases dramatically for each diffuser (as much as five or more times the area affected by aeration at the diffuser). Further, the power of the updraft or upwelling of the water effected by diffuser operation influences water movement at submerged depths well beyond the limited area of aeration at submerged depths. In a sense, the watery liquid is placed in vortical motion, moving up with diffuser air and down in portions exterior to the influence of the upward drift of that air. This motion can subject an entire lagoon of reasonable size to the desired aeration and purification. But as aforenoted, this vortical movement of the liquid is best maintained at a nominal level in areas below the diffuser (to protect particulate floors from damage); and this is accomplished by using an anti-vortex device, that is, a shield means, at the base of the diffuser, as aforediscussed.

The apparatus functions effectively to cause air entrainment, mixing and turbulence of liquid subjected to treatment. It does this with a relatively simple and relatively economical arrangement of elements, easily and economically installed and serviced and maintained.

Critical to the success of the composite apparatus is the fact that a plurality of diffuser means are disposed radially outwardly from a central source and at selected depths and distances from the central source for the air fed to them. The diffusers are hung from hanger means disposed in fixed (but optionally adjustable) array outwardly from the central source. Means (such as arms or stiff conduit elements or floats) are provided for holding the hanger means in the radially outward location from the central source, whether the distance selected is 1 foot or 10 or more feet from the source. Lateral air passages extend radially inwardly from the hanger means to the source, with or without intermediate curvatures and changes of direction for the lateral passage means between the hanger and source. Further, the composite apparatus, if desired to be maintained at a single floating location on a body of liquid, does not require complex mooring lines to hold it in position or against spinning movement. A single weight anchor (or even a diffuser, preferably rendered inactive) can be lowered to the bottom of a lagoon to hold the apparatus in position during aeration operation. The apparatus does not suffer from the torque problem (and consequently required mooring against spinning) characteristic of floating water-moving aerators of the propeller type. For the first time, insofar as is known, the art of processing polluted waters and sewage to effect purification of the same can now be handled reliably and efficiently at a cost and convenience within practical budgetary considerations.

Regardless of the number of lateral passage means employed in the apparatus, at least three, and preferably more, are associated with the hanger means and dependant assembly arrangements as herein described. Generally not over about eight dependant assemblies, of simple or complex nature, are necessary or desirable.

That which is claimed is:

1. Apparatus for aerating a liquid, said apparatus when placed in operation being easily serviced from the surface of the liquid, and including:
   i a central base structure comprising a source of air under pressure, said base structure being at a level, in relationship to the surface of the liquid, at least as high as a floating relationship on said surface,
   ii a plurality of lateral passage means extending radially outward from said source for conducting air outwardly from said source,
   iii a diffuser hanger means at substantially the outward end of at least three said passage means, each hanger means being disposed radially outward from said source in spaced relationship to all other said hanger means, and
   iv a dependant assembly suspended in hanging relationship downwardly from each said hanger means, each said assembly comprising (a) a downwardly depending flexible air conduit connected in operable air conducting relationship to the outward end of the lateral passage means at the respective hanger means with which a said assembly is associated, (b) an aeration diffuser means fixed substantially in pendant relationship to the lower end of said flexible air conduit in operable connection therewith for receiving air therefrom, said aeration diffuser means being adapted to allow escape of air therefrom for upward aeration movement through the liquid, and (c) means for substantially maintaining said aeration diffuser means at a submerged depth within the liquid in said pendant relationship as air is fed thereto from said source.

2. The apparatus of claim 1 wherein said source of air under pressure comprises a manifold and wherein said base structure additionally comprises pumping means for feeding air into said manifold.

3. The apparatus of claim 1 wherein said base structure additionally comprises a positive air displacement pump for feeding air to said source.

4. The apparatus of claim 1 wherein said base structure is adapted for mounting upon a solid ground-supported surface.

5. The apparatus of claim 1 wherein said base structure additionally comprises float means for supporting said base structure in floating relationship on the surface of the liquid.

6. The apparatus of claim 5 additionally comprising anchor means for stabilizing said floating base structure against substantial drift movements.

7. The apparatus of claim 1 wherein at least three said lateral passage means each comprises a substantially stiff pipe member held at its radially inward end at a substantially fixed mounting on said base structure.

8. The apparatus of claim 7 wherein each said pipe member extends angularly upward as well as radially outward from said base structure.

9. The apparatus of claim 7 wherein the outward end of each said pipe member is at a level, in relationship to the surface of the liquid, at least above said surface when said base structure is stabilized against tilting movement.

10. The apparatus of claim 7 wherein at least three said hanger means each comprises the outward end of said stiff pipe member.

11. The apparatus of claim 1 wherein at least three said hanger means each comprises a hanger member supported by an arm member extending radially outward from said base structure.

12. The apparatus of claim 11 wherein at least three said lateral passage means each comprises a flexible conduit extending substantially as a continuation of the downwardly depending flexible air conduit connected to said lateral passage means.

13. The apparatus of claim 1 additionally comprising a plurality of arm members extending in radially outward directions with respect to said base structure and held at their radially inward end at substantially fixed mounting locations on said base structure, and wherein a said hanger means is supported outwardly by each said arm member.

14. The apparatus of claim 13 wherein said arm members are adjustable in length.

15. The apparatus of claim 13 wherein at least three said lateral passage means each comprises a flexible conduit.

16. The apparatus of claim 15 wherein said flexible conduits of said lateral passage means are each substantially a continuation of a said downwardly depending flexible air conduit.

17. The apparatus of claim 16 additionally comprising means for holding selected lengths of a said flexible conduit on the lateral passage side of a said hanger means and thereby effecting adjustment of the depth of the said aeration diffuser means fixed in pendant relationship to such flexible conduit.

18. The apparatus of claim 1 additionally comprising float means for supporting said hanger means in floating relationship on the surface of the liquid.

19. The apparatus of claim 18 wherein at least three said lateral passage means each comprises a flexible conduit extending substantially as a continuation of the downwardly depending flexible air conduit connected to said lateral passage means.

20. The apparatus of claim 1 additionally comprising discrete float means for each said hanger means, each said float means being adapted to support its respective hanger means in floating relationship on the surface of the liquid, and guy members for maintaining said discrete float means radially disposed outward from said source and in spaced relationship to each other.

21. The apparatus of claim 20 wherein at least three said lateral passage means each comprises a flexible conduit.

22. The apparatus of claim 21 wherein at least three said depending flexible air conduits are respectively continuations of said three flexible conduits of said lateral passage means.

23. The apparatus of claim 22 additionally comprising means for holding selected lengths of a said flexible conduit on the lateral passage side of a said hanger means and thereby effecting adjustment of the depth of the said aeration diffuser means fixed in pendant relationship to such flexible conduit.

24. The apparatus of claim 1 wherein at least three said lateral passage means each comprises a flexible conduit.

25. The apparatus of claim 24 wherein at least three said depending flexible air conduits are respectively substantial continuations of said three flexible conduits of said lateral passage means.

26. The apparatus of claim 1 additionally comprising means accessible above the surface of the liquid for effecting adjustment of the depth of the said aeration diffuser means.

27. The apparatus of claim 1 additionally comprising regulating means for selectively adjusting the air flow for at least one of said aeration diffuser means to a level different from the air flow for at least one other said aeration diffuser means.

28. The apparatus of claim 1 additionally comprising means for moving the same to different locations on the surface of a liquid as aeration operation of the apparatus is conducted without interruption.

29. The apparatus of claim 1 wherein said aeration diffuser means comprises a housing having a wall with open minute passages extending therethrough for the passage of air.

30. The apparatus of claim 29 wherein said wall comprises porous plastic.

31. The apparatus of claim 29 additionally comprising a shield member affixed to the underside of said housing, said shield member being adapted to obstruct aeration draft movement of liquid located on the side of said shield away from said housing.

32. The apparatus of claim 1 wherein said means for maintaining said diffuser means at a submerged depth comprises a weight member which exerts its weight force on said diffuser means.

33. The apparatus of claim 1 wherein said dependant assembly additionally comprises shielding means for obstructing updraft movement of liquid from the locality below said aeration diffuser means as other liquid is drawn upwardly by rising air escaping from said diffuser means.

34. The apparatus of claim 33 wherein said shielding means comprises a plate member fixed to a said aeration diffuser means at a location downwardly therefrom.

35. The apparatus of claim 1 wherein said means for maintaining said diffuser means at a submerged depth comprises a weighted shielding means in fixed relationship to the lowermost side of said aeration diffuser means, said shielding means being adapted to obstruct updraft movement of liquid from the locality below said aeration diffuser means as other liquid is drawn upwardly by rising air escaping from said diffuser means.

36. The apparatus of claim 1 wherein said means for maintaining said diffuser means at a submerged depth comprises a shielding means which additionally functions to obstruct updraft movement of liquid from the locality below said aeration diffuser means as other liquid is drawn upwardly by rising air escaping from said diffuser means.

37. The apparatus of claim 1 wherein said aeration diffuser means includes at least one aeration diffuser assembly comprising a housing having a cavity therein, said housing being defined by walls, at least one wall thereof consisting essentially of a layer of structurally stiff and compression resistant organic plastic having open minute passages extending therethrough from the cavity side of said layer to the exterior side of said layer, said passages being adapted to allow the passage of air therethrough and the emergence of said air on said exterior side, and an evacuation hole in a wall of said housing.

38. The apparatus of claim 37 wherein said aeration diffuser assembly additionally includes a shield member affixed on the side of said housing which is lowermost during aeration use of said diffuser assembly, said shield being sufficiently large to extend outwardly as a circumscribing wing structure beyond said housing, said shield being adapted to obstruct aeration draft movement of liquid located on the side of said shield away from said housing.

39. The apparatus of claim 1 wherein said aeration diffuser means includes at least one aeration diffuser assembly comprising a housing having a wall with open minute passages extending therethrough for the passage of air, and a shield member affixed on the side of said housing which is lowermost during aeration use of said diffuser assembly, said shield comprising a wing structure extending annularly outwardly from said housing.

40. The apparatus of claim 1 wherein at least one said dependent assembly additionally comprises a shield member affixed to the underside of an aeration diffuser means, said shield member comprising a wing structure extending annularly outwardly and downwardly from said aeration diffuser means.

41. The apparatus of claim 1 wherein at least one said aeration diffuser means comprises more than one aeration diffuser assembly connected to a downwardly depending flexible air conduit through a plenum chamber.

42. The apparatus of claim 1 wherein said base structure additionally comprises means for feeding air to said source and filter means for filtering the air fed to said source.

43. The apparatus of claim 1 wherein said base structure additionally comprises float means for supporting said base structure in floating relationship on the surface of the liquid and wherein at least three said lateral passage means each comprises a substantially stiff pipe member held at its radially inward end at a substantially fixed mounting on said base structure.

44. The apparatus of claim 1 wherein said base structure additionally comprises float means for supporting said base structure in floating relationship on the surface of the liquid and wherein at least three said hanger means each comprises a hanger member supported by an arm extending radially outwardly from said base structure.

45. The apparatus of claim 44 wherein the lateral passage means to each said hanger member comprises a flexible conduit extending substantially as a continuation of the downwardly depending flexible air conduit at said respective hanger member.

46. An aeration diffuser assembly for introducing air into a liquid, comprising a housing having a cavity therein, an inlet port for feeding air into said cavity, and an evacuation hole for rapid purging of any water from said cavity when air is first fed thereto after said assembly has remained submerged in a liquid during a period when air was not fed thereto, said housing being defined by walls, one wall thereof consisting essentially of a layer of structurally stiff and compression resistant organic plastic in the form of a cylindrical sleeve which in use is oriented vertically, said one wall having open minute passages extending therethrough from the cavity side of said layer to the exterior side of said layer, said passages being adapted to allow the passage of air therethrough and the emergence of said air on said exterior side, a second wall of said housing consisting essentially of a top plate member over the upper end of said cylindrical sleeve and having said inlet port extending therethrough, and a third wall of said housing consisting essentially of a bottom plate member over the lower end of said cylindrical sleeve and having said evacuation hole extending therethrough, and a shield member affixed to said housing on a side of said housing which is lowermost during aeration use of said diffuser assembly, said shield being sufficiently large to extend outwardly as a circumscribing wing structure beyond said housing, said shield having a downwardly extending outward edge and being adapted to obstruct aeration draft movement of liquid located on the side of said shield away from said walled housing.

47. The diffuser assembly of claim 46, additionally comprising a weight member for maintaining said diffuser assembly at a submerged depth within a liquid as air is fed thereto.

48. The diffuser assembly of claim 46, additionally comprising a flexible air conduit for conveying air to said inlet port, said diffuser assembly being adapted to be suspended in pendant relationship with respect to said flexible air conduit.

49. The diffuser assembly of claim 34 wherein said organic plastic comprises polyurethane.

50. An aeration diffuser assembly for introducing air into a liquid, comprising a walled housing having a cavity therein, at least more than one-fourth of the total gross interior surface area and at least more than one-fourth of the total gross exterior surface area of the walls of said housing consisting essentially of opposing surfaces of a layer of structurally stiff and compression resistant organic plastic in the form of a cylindrical sleeve which in use is oriented vertically, said sleeve of organic plastic having open minute passages extending therethrough from the cavity said thereof to the exterior side thereof, said passages being adapted to allow the passage of air therethrough and the emergence of said air on said exterior side, a top plate member over the upper end of said cylindrical sleeve, an inlet port through said top plate member for feeding air into said cavity, a bottom plate member over the lower end of said cylindrical sleeve, an evacuation hole through said bottom plate member for rapid purging of any water from said cavity when air is first fed thereto after said assembly has remained submerged in a liquid during a period when air was not fed thereto, and a shield member affixed to said housing on a side of said housing which is lowermost during aeration use of said diffuser assembly, said shield being sufficiently large to extend outwardly as a circumscribing wing structure beyond said housing, said shield having a downwardly extending outward edge and being adapted to obstruct aeration draft movement of liquid located on the side of said shield away from said walled housing.

* * * * *

UNITED STATES PATENT AND TRADEMARK OFFICE
CERTIFICATE OF CORRECTION

PATENT NO. : 3,956,432
DATED : May 11, 1976
INVENTOR(S) : David L. Hilling

It is certified that error appears in the above-identified patent and that said Letters Patent are hereby corrected as shown below:

Column 7, line 18, "where" should read --Where--; line 50, "flat" should read --float--. Column 13, line 31, delete the large zero "0" at end of line; lines 32-33, "relationhip" should read --relationship--; line 35, "parrt" should read --part--; line 50, "pole)" should read --radially--; line 51, "relationship" should read --In--; line 54, "part" should read --flexible--.

Column 22, line 12 (in Claim 49) "claim 34" should read --claim 46--.

Signed and Sealed this

Sixteenth Day of November 1976

[SEAL]

Attest:

RUTH C. MASON
*Attesting Officer*

C. MARSHALL DANN
*Commissioner of Patents and Trademarks*